(12) United States Patent
Himawan et al.

(10) Patent No.: US 8,751,791 B2
(45) Date of Patent: Jun. 10, 2014

(54) METHOD AND DEVICE FOR CONFIRMING AUTHENTICITY OF A PUBLIC KEY INFRASTRUCTURE (PKI) TRANSACTION EVENT

(75) Inventors: Erwin Himawan, Chicago, IL (US); Ananth Ignaci, Lake-in-the-Hills, IL (US); Anthony R. Metke, Naperville, IL (US); Shanthi E. Thomas, Carpentersville, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 1157 days.

(21) Appl. No.: 12/212,032

(22) Filed: Sep. 17, 2008

(65) Prior Publication Data
US 2010/0070755 A1    Mar. 18, 2010

(51) Int. Cl.
*H04L 29/06* (2006.01)
*H04L 9/32* (2006.01)

(52) U.S. Cl.
USPC .......... 713/155; 713/156; 713/157; 713/158; 713/169; 713/170; 713/171; 713/173; 713/175; 713/176; 713/180; 726/2; 726/3; 726/5; 726/6; 726/10; 726/26; 380/277; 380/278; 380/282

(58) Field of Classification Search
USPC .................... 713/155–157, 176, 173; 726/10; 380/282
See application file for complete search history.

(56) References Cited

U.S. PATENT DOCUMENTS

| 5,991,411 A | 11/1999 | Kaufman et al. | |
|---|---|---|---|
| 6,240,187 B1 * | 5/2001 | Lewis | 380/282 |
| 7,177,839 B1 * | 2/2007 | Claxton et al. | 705/44 |
| 2001/0032310 A1 * | 10/2001 | Corella | 713/156 |
| 2002/0023221 A1 | 2/2002 | Miyazaki et al. | |
| 2002/0062438 A1 * | 5/2002 | Asay et al. | 713/157 |
| 2003/0110372 A1 * | 6/2003 | Proudler | 713/150 |
| 2003/0140252 A1 * | 7/2003 | Lafon et al. | 713/201 |
| 2004/0068650 A1 * | 4/2004 | Resnitzky et al. | 713/155 |

(Continued)

FOREIGN PATENT DOCUMENTS

| EP | 0969430 A1 | 1/2000 |
|---|---|---|
| EP | 1258844 A1 | 11/2002 |

OTHER PUBLICATIONS

Wang et al, A Non-repudiable Protocol for Secure Messaging, 2007, IEEE, pp. 490-494.*
Mike Just et al., "Addressing the Problem of Undetected Signature Key Compromise," Network and Distributed System Security (NDSS), 1999, 12 pages.

(Continued)

*Primary Examiner* — Kambiz Zand
*Assistant Examiner* — Jenise Jackson
(74) *Attorney, Agent, or Firm* — Randi L. Karpinia; Steven A. May; Daniel R. Bestor

(57) ABSTRACT

A method and device for confirming authenticity of a public key infrastructure (PKI) transaction event between a relying node and a subject node in a communication network enables improved network security. According to some embodiments, the method includes establishing at a PKI event logging (PEL) server a process to achieve secure communications with the relying node (step 705). Next, the PEL server processes reported PKI transaction event data received from the relying node (step 710). The reported PKI transaction event data describe the PKI transaction event between the relying node and the subject node. The reported PKI transaction event data are then transmitted from the PEL server to the subject node (step 715). The subject node can thus compare the reported PKI transaction event data with corresponding local PKI transaction event data to confirm the authenticity of the PKI transaction event.

18 Claims, 11 Drawing Sheets

(56) References Cited

U.S. PATENT DOCUMENTS

| | | | |
|---|---|---|---|
| 2004/0215708 A1* | 10/2004 | Higashi et al. | 709/201 |
| 2005/0246550 A1* | 11/2005 | Orbke et al. | 713/182 |
| 2006/0174122 A1 | 8/2006 | Falch et al. | |
| 2006/0282670 A1 | 12/2006 | Karchov | |
| 2007/0067373 A1* | 3/2007 | Higgins et al. | 707/206 |
| 2007/0130473 A1* | 6/2007 | Mazotas | 713/183 |
| 2008/0052183 A1* | 2/2008 | Hobson et al. | 705/26 |
| 2008/0172559 A1* | 7/2008 | Yellepeddy | 713/158 |
| 2008/0189778 A1 | 8/2008 | Rowley | |
| 2009/0031131 A1* | 1/2009 | Qiu et al. | 713/172 |
| 2009/0086977 A1* | 4/2009 | Berggren | 380/279 |
| 2011/0031310 A1* | 2/2011 | Wilson | 235/380 |
| 2012/0008787 A1* | 1/2012 | Wan et al. | 380/285 |

OTHER PUBLICATIONS

International Search Report and Written Opinion for International Application No. PCT/US2009/053816 mailed on Mar. 29, 2010.
International Preliminary Report on Patentability for International Application No. PCT/US2009/053816 mailed on Mar. 31, 2011.
Supplementary Search Report for European Patent application No. 09814960.2 mailed Dec. 12, 2012.
Herda, S., "Non-repudiation: Constituting evidence and proof in digital cooperation," Computer, Standards & Interferences, vol. 17, Issue 1, pp. 69-79, Jan. 1, 1995.
"Applied Digital Receipt Solutions for e-Commerce. Integrating Digital Receipt Solutions into e-Commerce Transactions," Valicert Inc., XP002687212, pp. 22, 2000.

* cited by examiner

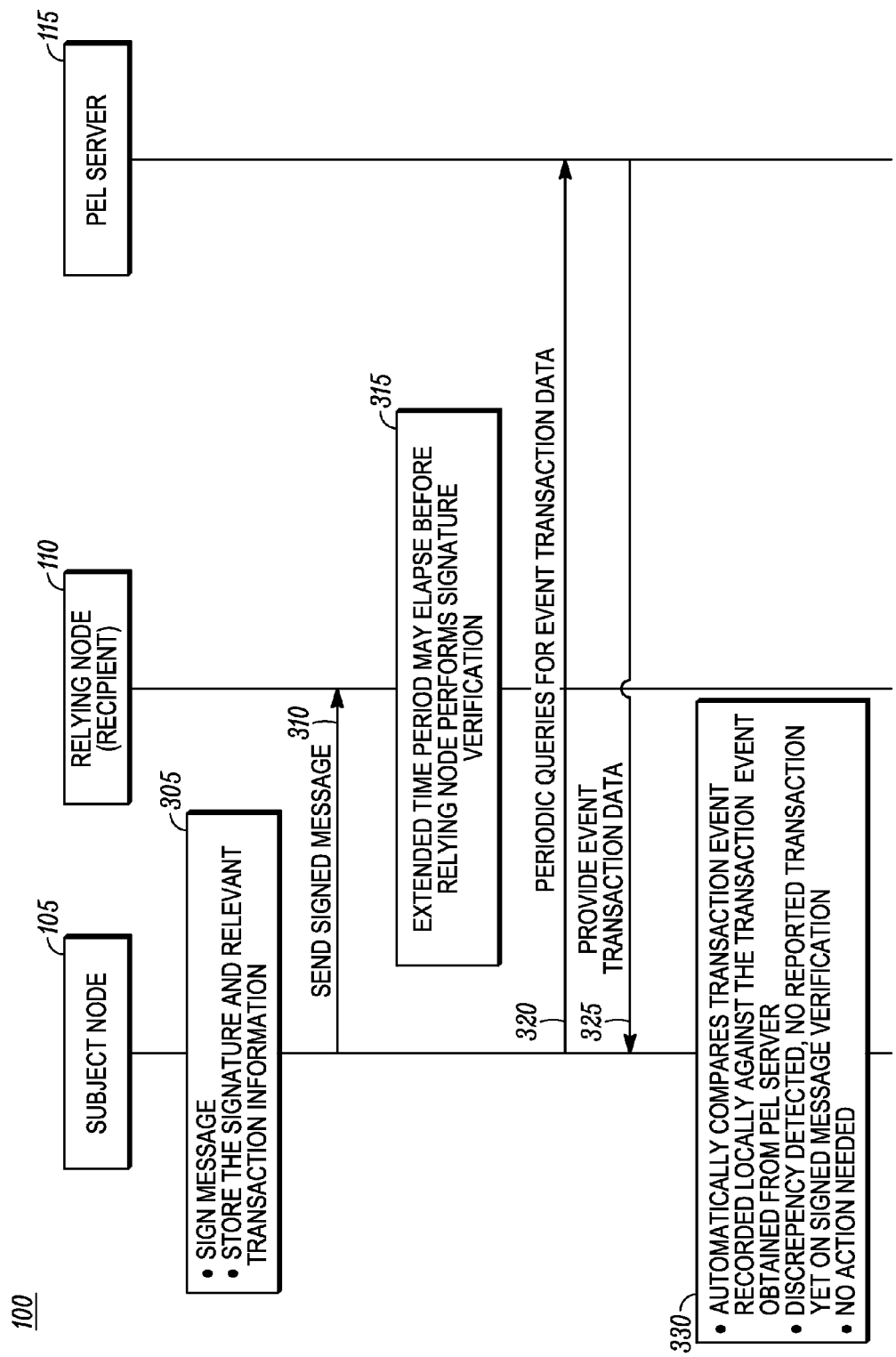

METHOD AND DEVICE FOR CONFIRMING AUTHENTICITY OF A PUBLIC KEY INFRASTRUCTURE (PKI) TRANSACTION EVENT

FIELD OF THE DISCLOSURE

The present invention relates generally to wireless communication networks, and in particular to determining whether a private key of a subject node in a network has been compromised.

BACKGROUND

Secure transmissions in wireless networks, including ad hoc wireless communication networks, are often based on the use of certificates. A certification authority (CA) is a trusted network entity that issues digital certificates for use by other network entities. CAs are a characteristic of many public key infrastructure (PKI) schemes. A public key certificate is a certificate that uses a digital signature to bind together a public key with personal and/or physical attributes of an entity, which may be one or more people or one or more devices. Attributes of a person can include, for example, a person's name, address, or date of birth; and attributes of a device can include, for example, an internet protocol (IP) address, a medium access control (MAC) address, or a serial number.

A CA can issue a public key certificate that confirms that the CA attests that the public key contained in the certificate belongs to the person, organization, server, or other network entity identified in the certificate. The CA thus verifies an applicant's credentials, so that other network users, known as relying parties, can trust the information in the CA's certificates. Commonly, if a user trusts the CA and can verify the CA's signature, then the user can also verify that a certain public key does indeed belong to an entity identified in a certificate issued by the CA.

Prior to issuing a public key certificate to an entity, a CA performs a due diligence step to authenticate the entity's claims to particular personal and/or physical attributes. The CA also authenticates the entity's possession of a claimed private/public key pair.

In a typical public key certificate validation, a relying node validates a remote node's public key certificate. Also, through an authentication procedure, the relying node ensures that the remote node possesses the private key associated with a validated certificate. However, it can be quite difficult for the relying node to determine whether the remote node is the legitimate owner of the private/public key pair. For example, the legitimate owner of a private/public key pair may be careless in safeguarding the private key, which may result in theft of the private/public key pair.

There are many scenarios where a private key can be compromised. For example, some scenarios involve theft of a physical private key/certificate storage device, such as theft of a smart card that stores a private key/certificate. Sometimes such scenarios may be easily and quickly detected by users. However, other scenarios may involve more surreptitious techniques, such as the use of malware or a successful algorithm attack on a network, which may not be easily detected by network users. A stolen private key then may be used for nefarious purposes until its associated certificate expires.

PKI schemes thus often include a chain of trust having many links, and where the chain is only as strong as its weakest link. The security of PKI private keys, particularly in environments where secure key storage is not available, is commonly a weak link in PKI schemes. Accordingly, there is a need for an improved method and device for confirming the authenticity of a PKI transaction event between a relying node and a subject node in a communication network, including determining that a private key of the subject node has not been compromised.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

FIGS. 3A and 3B are message sequence charts illustrating communications in a wireless communication network involving legitimate use of a private key/certificate pair for message signing, according to some embodiments.

Figure 1:
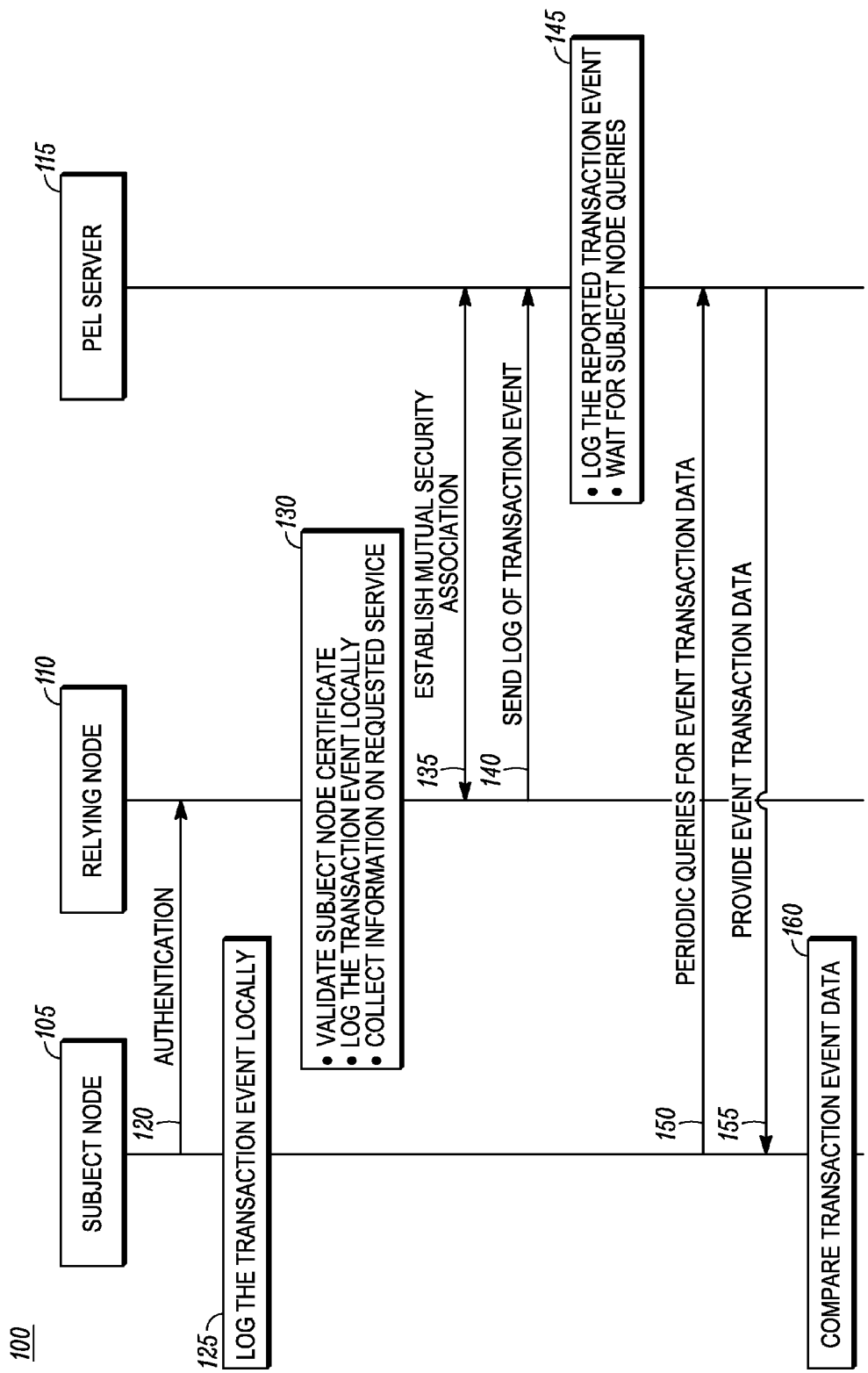
FIG. 1 is a message sequence chart illustrating communications in a wireless communication network involving legitimate use of a private key/certificate pair for authentication, according to some embodiments of the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

According to some embodiments of the present invention, a method enables confirmation of the authenticity of a public key infrastructure (PKI) transaction event between a relying node and a subject node in a communication network, where the authenticity is confirmed at the subject node. The method includes establishing at a PKI event logging (PEL) server a process to achieve secure communications with the relying node. Next, the PEL server processes reported PKI transaction event data received from the relying node. The reported PKI transaction event data describe the PKI transaction event between the relying node and the subject node. The reported PKI transaction event data are then transmitted from the PEL server to the subject node. The subject node can thus compare the reported PKI transaction event data with corresponding local PKI transaction event data to confirm the authenticity of the PKI transaction event.

According to other embodiments of the present invention, a method confirms authenticity of a public key infrastructure (PKI) transaction event between a relying node and a subject node in a communication network, where the authenticity is confirmed at a PKI event logging (PEL) server. The method includes establishing at the PEL server a process to achieve secure communications with the relying node. Next, the PEL server processes reported PKI transaction event data received from the relying node. The reported PKI transaction event data describe the PKI transaction event between the relying node and the subject node. The PEL server then compares the reported PKI transaction event data and corresponding local PKI transaction event data received from the subject node, whereby the PEL server confirms the authenticity of the PKI transaction event.

Embodiments of the present invention thus can be used for various electronic transactions that involve digital certificates, such as for purposes of identification or for digital signature verification, to confirm that a private key of a subject node has not been compromised. Because the security of private keys is commonly a weak link in PKI schemes, the present invention enables network users to both protect the security of private keys where possible, and to detect compromised private keys if that security is breached.

Referring to FIG. 1, a message sequence chart illustrates communications in a wireless communication network 100 involving legitimate use of a private key/certificate pair for authentication, according to some embodiments of the present invention. Consider, for example, that the wireless communication network 100 includes a subject node 105, a relying node 110, and a PEL server 115, where the subject node 105 seeks to employ services of the PEL server 115 to confirm that a private key of the subject node 105 has not been compromised. Thus the PEL server 115 can be, for example, any trusted centralized entity operating in the wireless communication network 100.

The wireless communication network 100 can comprise various types of network architectures including a mesh enabled architecture (MEA) network or an Institute of Electrical and Electronics Engineers (IEEE) 802.11 network (i.e. 802.11a, 802.11b, 802.11g, 802.11n or 802.11s). (For these and any IEEE standards recited herein, see: http://standards.ieee.org/getieee802/index.html or contact the IEEE at IEEE, 445 Hoes Lane, PO Box 1331, Piscataway, N.J. 08855-1331, USA.) It will be appreciated by those of ordinary skill in the art that the wireless communication network 100 can alternatively comprise any packetized communication network where packets are forwarded across multiple wireless hops. For example, the wireless communication network 100 can be a network utilizing multiple access schemes such as OFDMA (orthogonal frequency division multiple access), TDMA (time division multiple access), FDMA (Frequency Division Multiple Access), or CSMA (Carrier Sense Multiple Access).

First, the subject node 105 transmits an authentication message 120 to the relying node 110 in response to an authentication process initiated by the relying node 110. The relying node 110 thus intends to use a certificate of the subject node 105 to authenticate the subject node 105.

As shown at block 125, transaction event data concerning the authentication message 120 are then logged at the subject node 105. At block 130, the relying node 110 validates the certificate of the subject node 105, logs the transaction event locally, and may also collect additional information concerning the services requested by the subject node 105. Also, when the subject node 105 uses its public key certificate for authentication, it keeps a local copy of an authentication transaction log that can subsequently be validated by the PEL server 115.

During validation of the certificate of the subject node 105, the relying node 110 may obtain a uniform resource locator (URL) of the PEL server 115. For example the URL of the PEL server 115 may be included in an attribute of the certificate of the subject node 105. Further, a universal organizational identification (OID) describing various validation outcome reason codes can be available to facilitate interoperability between the relying node 110 and the PEL server 115.

Initiated by the relying node 110, messages 135 are then exchanged between the relying node 110 and the PEL server 115 to establish a mutual security association between the relying node 110 and the PEL server 115. For example, establishing such a mutual security association may include execution of a four-way handshake, as known by those having ordinary skill in the art. After the mutual security association is established, the relying node 110 transmits to the PEL server 115 a reporting message 140 including a log of the transaction event concerning the subject node 105 and the relying node 110. The log includes PKI transaction event data that describe the authentication event between the relying node 110 and the subject node 105. At block 145, the PEL server 115 maintains an archive of information concerning the transaction event data and then waits for a query to be received from the subject node 105.

The subject node 105 then transmits a query message 150 to the PEL server 115. For example, the query message 150 may be one of a series of periodic query messages that are regularly transmitted from the subject node 105 to the PEL server 115.

In response to the query message 150, the PEL server 115 transmits to the subject node 105 the reported PKI transaction event data in a reporting message 155. At block 160, the subject node 105 can then compare the reported PKI transaction event data with its corresponding local PKI transaction event data to confirm the authenticity of the PKI transaction event.

The PKI transaction event data can comprise various types of parameters and variables. For example, the PKI transaction event data can include a PKI certificate subject, a PKI certificate issuer distinguished name, a subject key identifier (SKI), an issuer key identifier (AKI), a PKI certificate serial number, a transaction identification, a transaction amount, a hash of transaction details, a digital signature of transaction details, a transaction date, a transaction time stamp, a requested transaction type, an originating internet protocol (IP) address of a relying node, and an identification of a triggering application of a relying node.

Figure 2A:
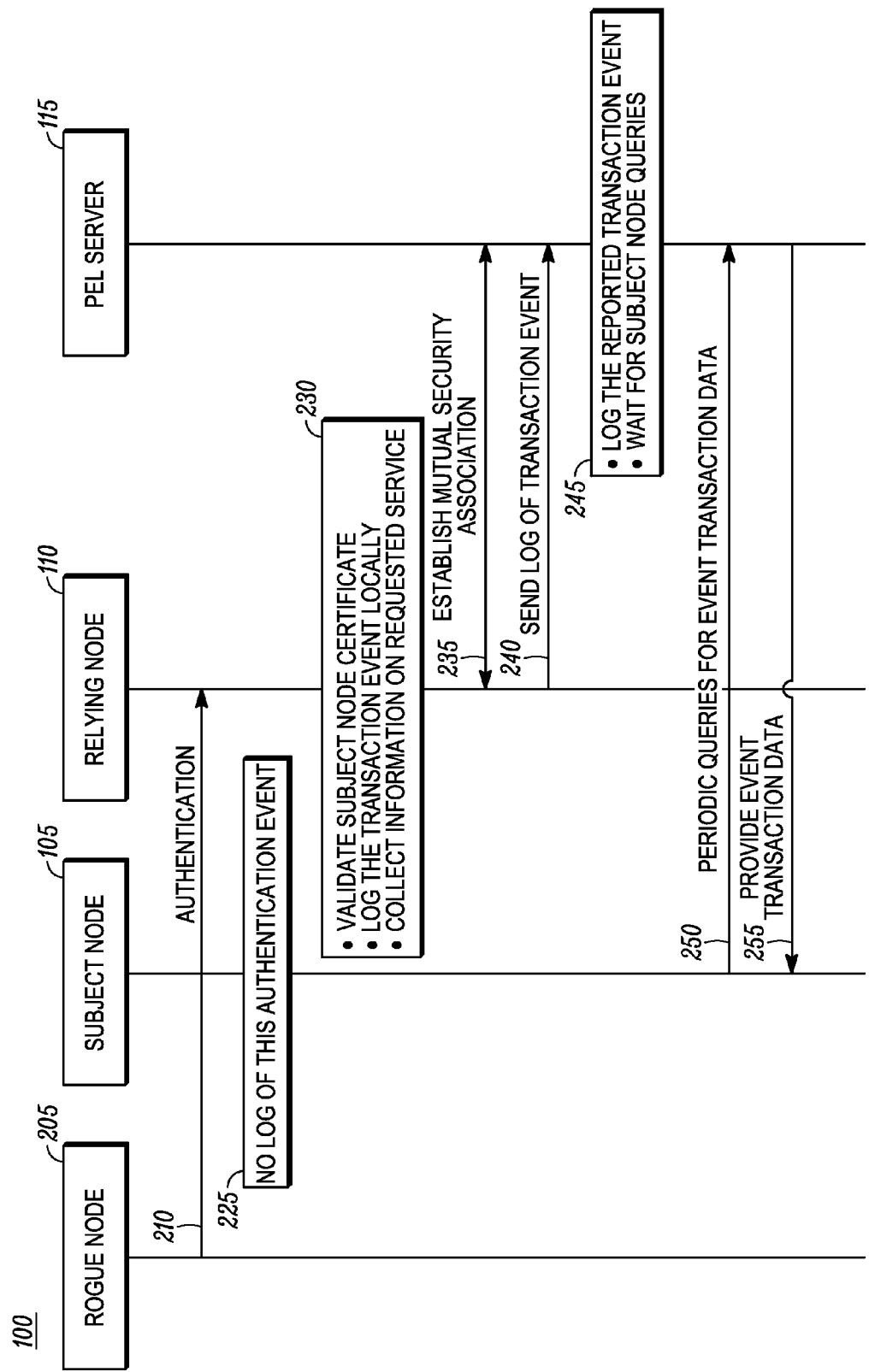
FIGS. 2A and 2B are message sequence charts illustrating communications in a wireless communication network involving illegitimate use of a private key/certificate pair for authentication, according to some embodiments.
Figure 2B:
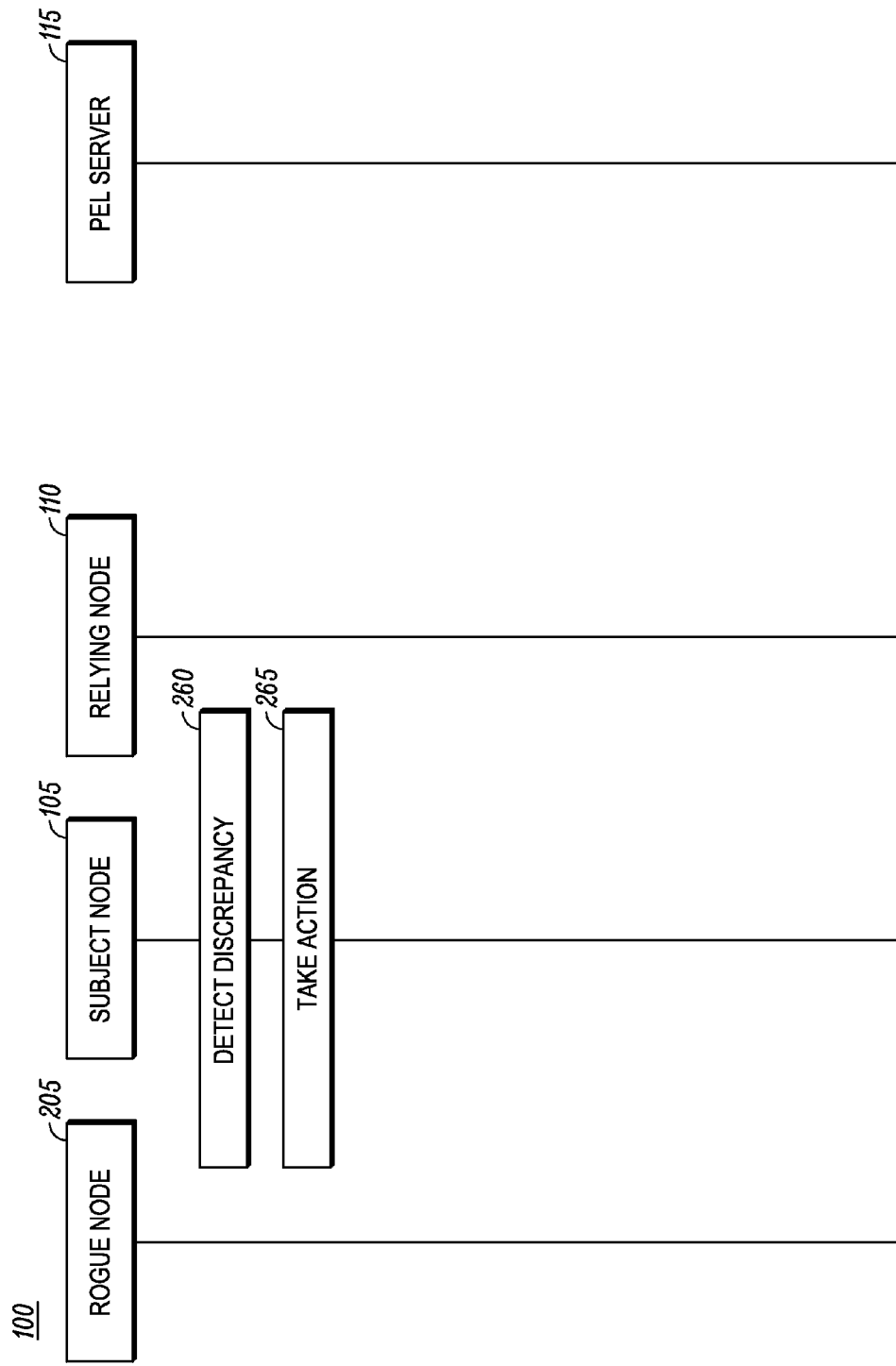

Referring to FIGS. 2A and 2B, message sequence charts illustrate communications in the wireless communication network 100 involving illegitimate use of a private key/certificate pair for authentication, where a private key has been stolen by a rogue node 205. Here, instead of the relying node 110 receiving the legitimate authentication message 120 from the subject node 105, the relying node 110 receives an illegitimate authentication message 210 from the rogue node 205. A series of messages and processes defined by reference numerals 210, 225, 230, 235, 240, 245, 250, 255 then proceed identically to the corresponding series of messages and processes defined above, respectively, by reference numerals 110, 125, 130, 135, 140, 145, 150, 155.

However, after the subject node 105 receives the reporting message 255 from the PEL server 115, at block 260 the subject node 105 will detect a discrepancy between its local event log and the transaction event data included in the reporting message 255. At block 265, the subject node 105 can then take action to invalidate the compromised private key used by the rogue node 205, and thus prevent further nefarious network activity by the rogue node 205. For example, the subject node 105 may transmit a certificate revocation request to its certificate issuing authority.

Figure 3B:
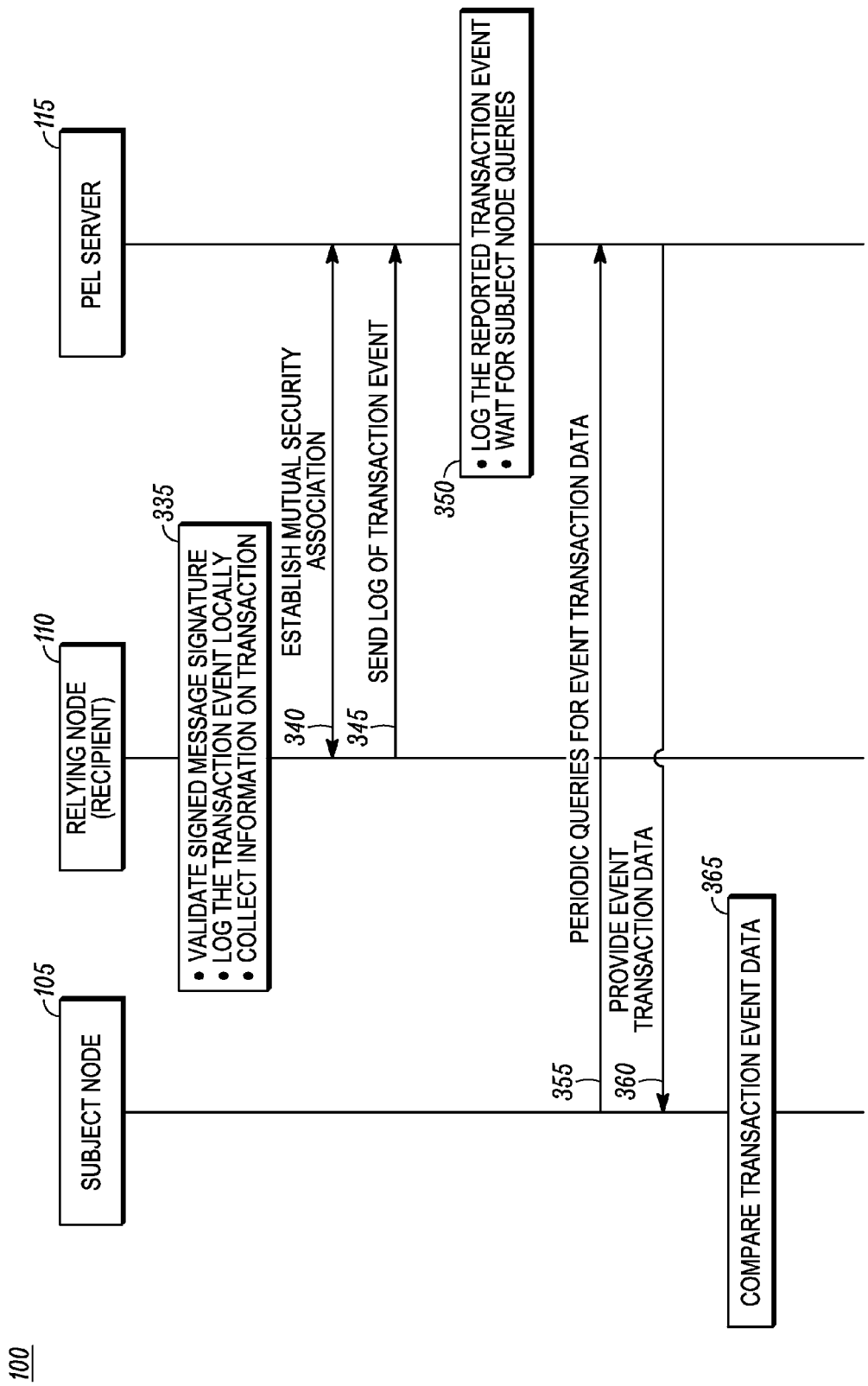

Referring to FIGS. 3A and 3B, message sequence charts illustrate communications in the wireless communication network 100 involving legitimate use of a private key/certificate pair for document signing, according to some embodiments of the present invention. At block 305, consider that the subject node 105 signs a document and then stores locally the associated signature and PKI transaction event data. The subject node 105 then transmits the signed document 310 to the relying node 110. Block 315 then represents elapse of an extended time period before the relying node 110 performs a verification of the signed document 310.

Before the relying node 110 performs a verification of the signed document 310, the subject node 105 transmits a periodic query message 320 to the PEL server 115. The PEL server 115 then responds with a reporting message 325, which includes event transaction data stored at the PEL server 115 from previous verification processes. At block 330, the subject node 105 automatically compares the PKI transaction event data stored locally with reported PKI transaction event data included in the reporting message 325.

Because the relying node 110 has not yet transmitted to the PEL server 115 PKI transaction event data concerning the signed document 310, the subject node 105 will detect a discrepancy between the PKI transaction event data stored locally with reported PKI transaction event data. However, no action is required of the subject node 105 because the discrepancy does not concern any illegitimate PKI transaction event data.

At block 335, consider that the relying node 110 validates the signature of the signed document 310, logs the transaction event locally, and collects additional information concerning the signed document 310. Messages 340 are then exchanged between the relying node 110 and the PEL server 115 to establish a mutual security association between the relying node 110 and the PEL server 115. After the mutual security association is established, the relying node 110 transmits to the PEL server 115 a message 345 including a log of the transaction event concerning the subject node 105 and the relying node 110. The log includes PKI transaction event data that describe the event concerning the signed document 310 transferred between the relying node 110 and the subject node 105. At block 350, the PEL server 115 stores information concerning the transaction event and then waits for a query to be received from the subject node 105.

The subject node 105 then transmits a query message 355 to the PEL server 115. For example, the query message 355 may be one of a series of periodic query messages that are regularly transmitted from the subject node 105 to the PEL server 115.

In response to the query message 355, the PEL server 115 transmits to the subject node 105 the reported PKI transaction event data in a reporting message 360. At block 365, the subject node 105 can then compare the reported PKI transaction event data with its corresponding local PKI transaction event data to confirm that there is no discrepancy between the locally stored signature of the signed document 310 and the signature included in the reported PKI transaction event data.

Concerning digital signature verification transaction events, the subject node 105 may not have a local copy of a transaction signature, because a digital signature verification event by the relying node 110 may occur at any time after a signed document has been sent, and may not involve the subject node 105. Therefore, such transaction events reported by the PEL server 115 are verified by the subject node 105 by comparing each signature included in reported PKI transaction event data with all signatures from documents previously signed by the subject node 105. If a match is not found for a signature included in reported PKI transaction event data, then it implies that the private key of the subject node 105 has been compromised and that a rogue node has used the private key to sign fraudulent document. The above detection mechanism thus relies on the subject node 105 having access to all of its previously signed documents within a particular time of interest.

Figure 4A:
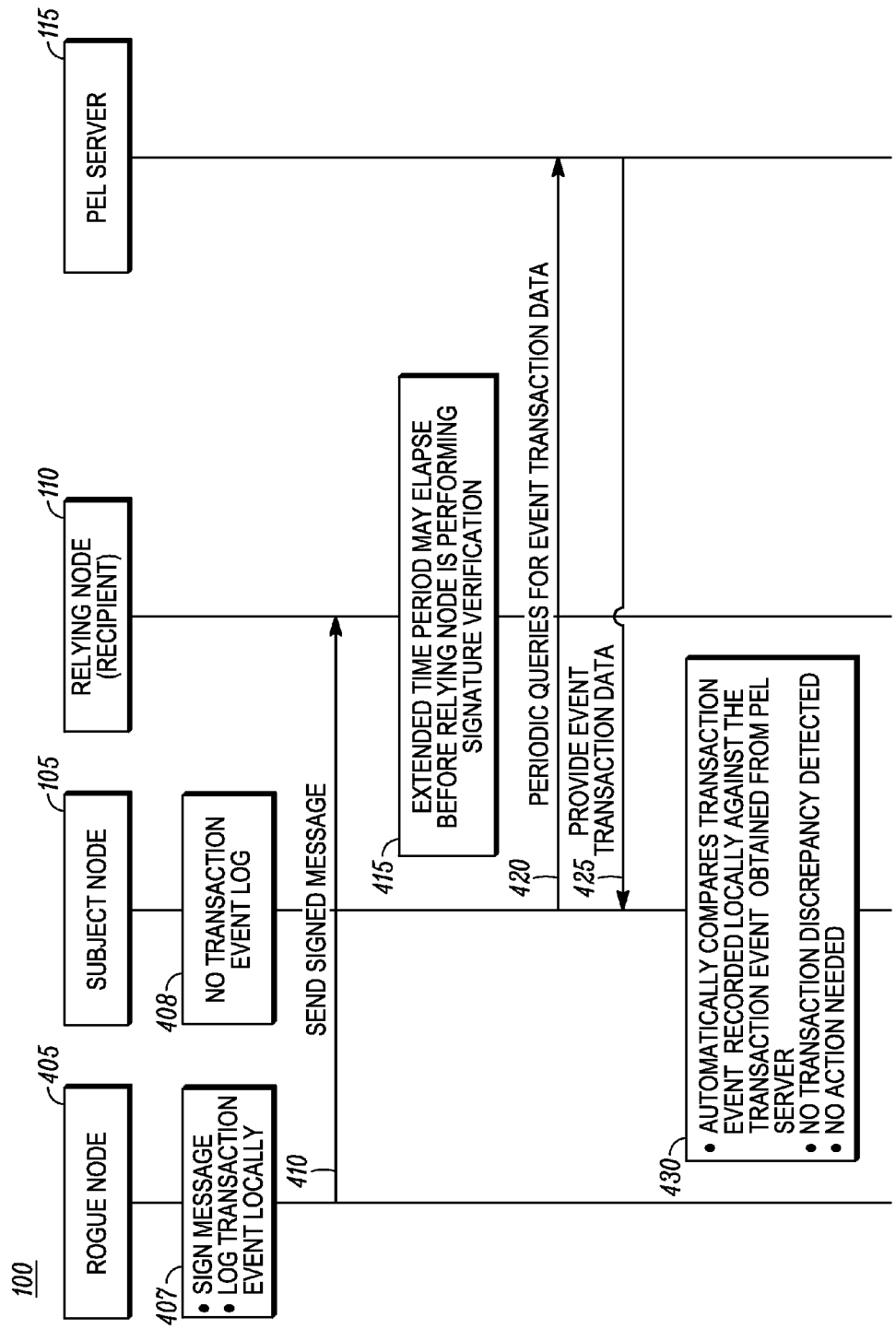
FIGS. 4A and 4B are message sequence charts illustrating communications in a wireless communication network involving illegitimate use of a private key/certificate pair for message signing, according to some embodiments.
Figure 4B:
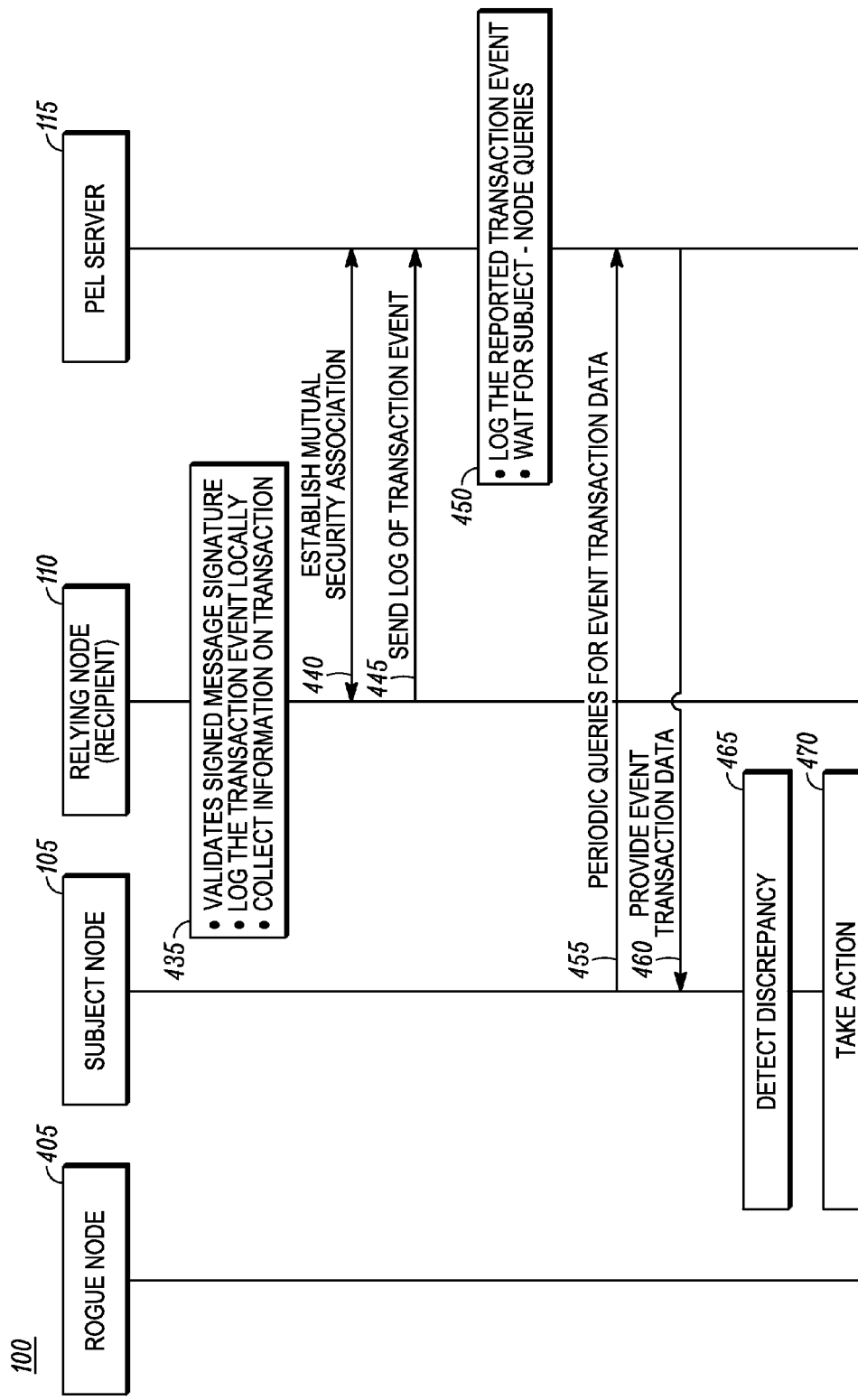

Referring to FIGS. 4A and 4B, message sequence charts illustrate communications in the wireless communication network 100 involving illegitimate use of a private key/certificate pair for document signing, where a private key has been stolen by a rogue node 405. At block 407 the rogue node 405 signs a document using a compromised private key that was stolen from the subject node 105. Block 408 indicates that no PKI transaction event data are logged at the subject node 105, because the subject node 105 is unaware of the illegitimate use of its private key by the rogue node 405. The rogue node then transmits the signed document 410 to the relying node 110.

A series of messages and processes defined by reference numerals 415, 420, 425, 430, 435, 440, 445, 450, 455, 460 then proceed identically to the corresponding series of messages and processes defined above, respectively, by reference numerals 315, 320, 325, 330, 335, 340, 345, 350, 355, 360.

However, after the subject node 105 receives the reporting message 460 from the PEL server 115, at block 465 the subject node 105 will detect a discrepancy between its local event log and the transaction event data included in the reporting message 460. At block 470, the subject node 105 can then take action to invalidate the compromised private key used by the rogue node 405, and thus prevent further nefarious network activity by the rogue node 405. For example, the subject node 105 may transmit a certificate revocation request to its certificate issuing authority.

As described above, reported PKI transaction event data can be transmitted from a PEL server to a subject node in response to a query message received at the PEL server from the subject node. Such a process may be referred to as a "pull method" for receiving reported PKI transaction event data at a subject node. According to alternative embodiments of the present invention, reported PKI transaction event data can be automatically transmitted from a PEL server to a subject node in response to processing at the PEL server the reported PKI transaction event data. Such an automatic process may be referred to as a "push method" for receiving reported PKI transaction event data at a subject node. Such a "push method" may include, for example, transmitting email notifications to a subject node or maintaining a continuous security association between a PEL server and a subject node.

When a subject node receives a transaction verification query from a relevant PEL server, the subject node may automatically compare its local log of transaction events with a log of transaction events received from the PEL server. If the log received from the PEL server identifies one or more transaction events that do not appear in the local log, then the subject node may conclude that its private key/certificate pair has been compromised.

Figure 5:
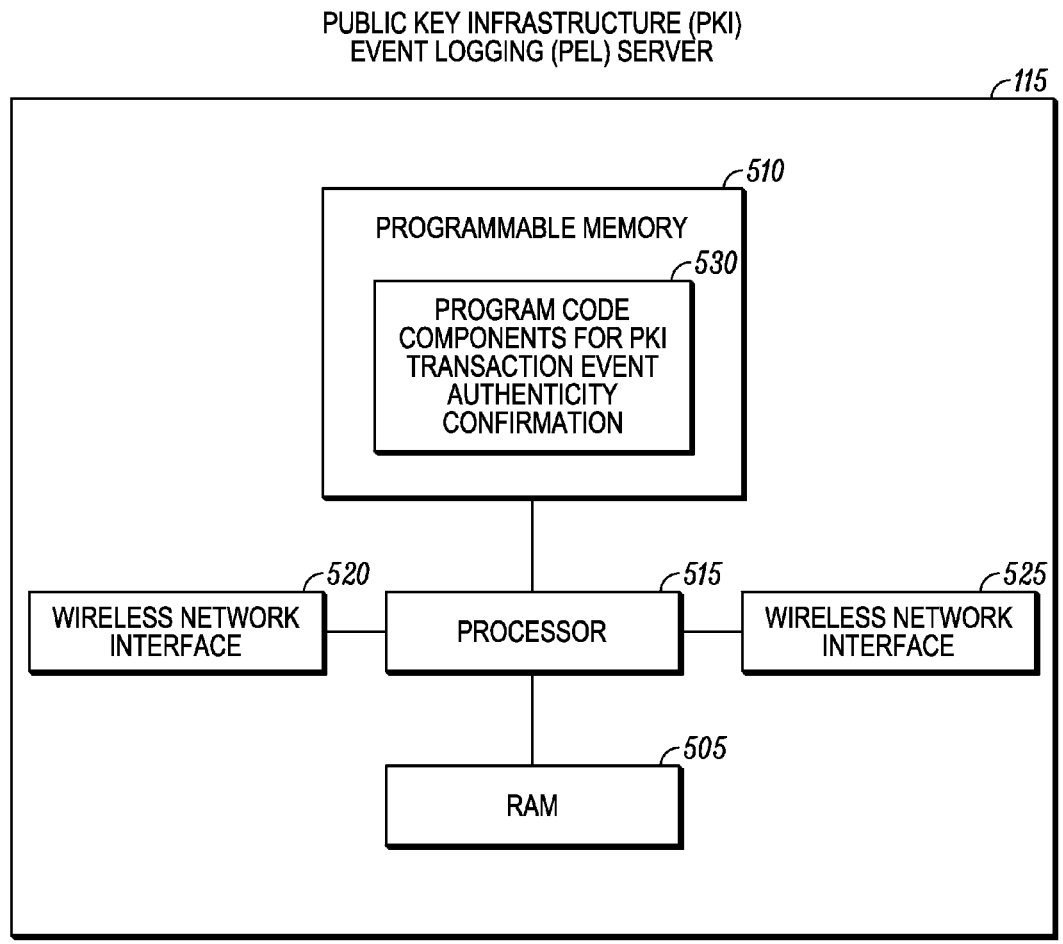
FIG. 5 is a block diagram illustrating components of a public key infrastructure (PKI) event logging (PEL) server device, according to some embodiments.

Referring to FIG. 5, a block diagram illustrates components of a PKI event logging (PEL) server device, such as the PEL server 115, according to some embodiments. The PEL server 115, for example, can be an integrated unit containing at least all the elements depicted in FIG. 5, as well as any other elements necessary for the PEL server 115 to perform its particular functions. Alternatively, the PEL server 115 can comprise a collection of appropriately interconnected units or devices, wherein such units or devices perform functions that are equivalent to the functions performed by the elements depicted in FIG. 5.

The PEL server 115 comprises a random access memory (RAM) 505 and a programmable memory 510 that are coupled to a processor 515. The processor 515 also has ports for coupling to wireless network interfaces 520, 525. The wireless network interfaces 520, 525 can be used to enable the PEL server 515 to communicate with other node devices in a wireless communication network, such as the wireless communication network 100. For example, the PEL server 115 can communicate with the relying node 110 using the wireless network interface 520 to receive and route data packets. It will be appreciated by those of ordinary skill in the art that two wireless network interfaces are shown for illustrative purposes only herein; and that any number of wireless network interfaces can be implemented within the scope of the invention.

The programmable memory 510 can store operating code (OC) for the processor 515 and code for performing functions associated with a PEL server. For example, the programmable memory 510 can store PKI transaction event data, and can also store computer readable program code components 530 configured to cause execution of a method for confirming authenticity of a PKI transaction event as described herein.

Figure 6A:
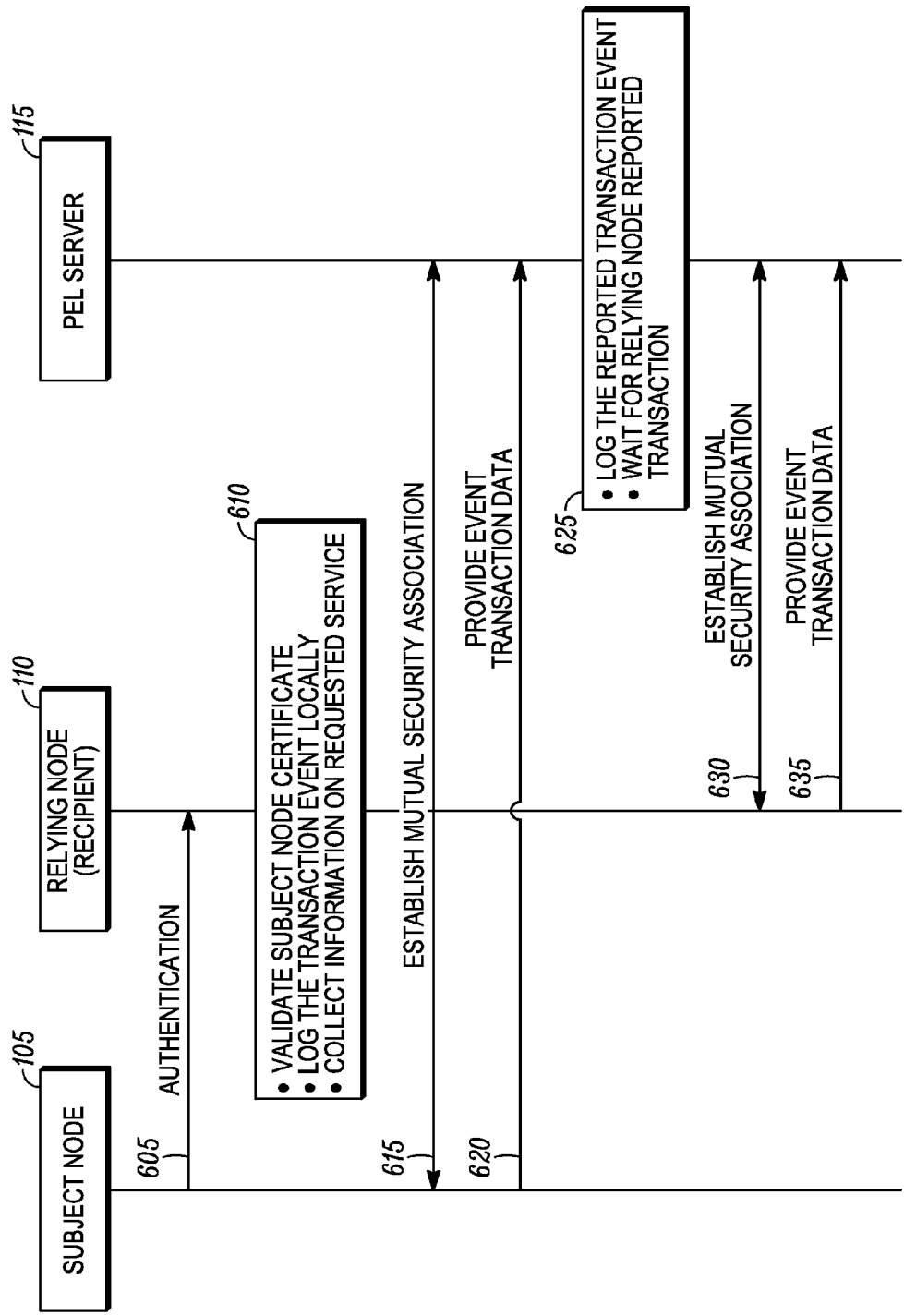
FIGS. 6A and 6B are message sequence charts illustrating another alternative embodiment of the present invention, where a PEL server actively confirms the authenticity of a PKI transaction event.
Figure 6B:
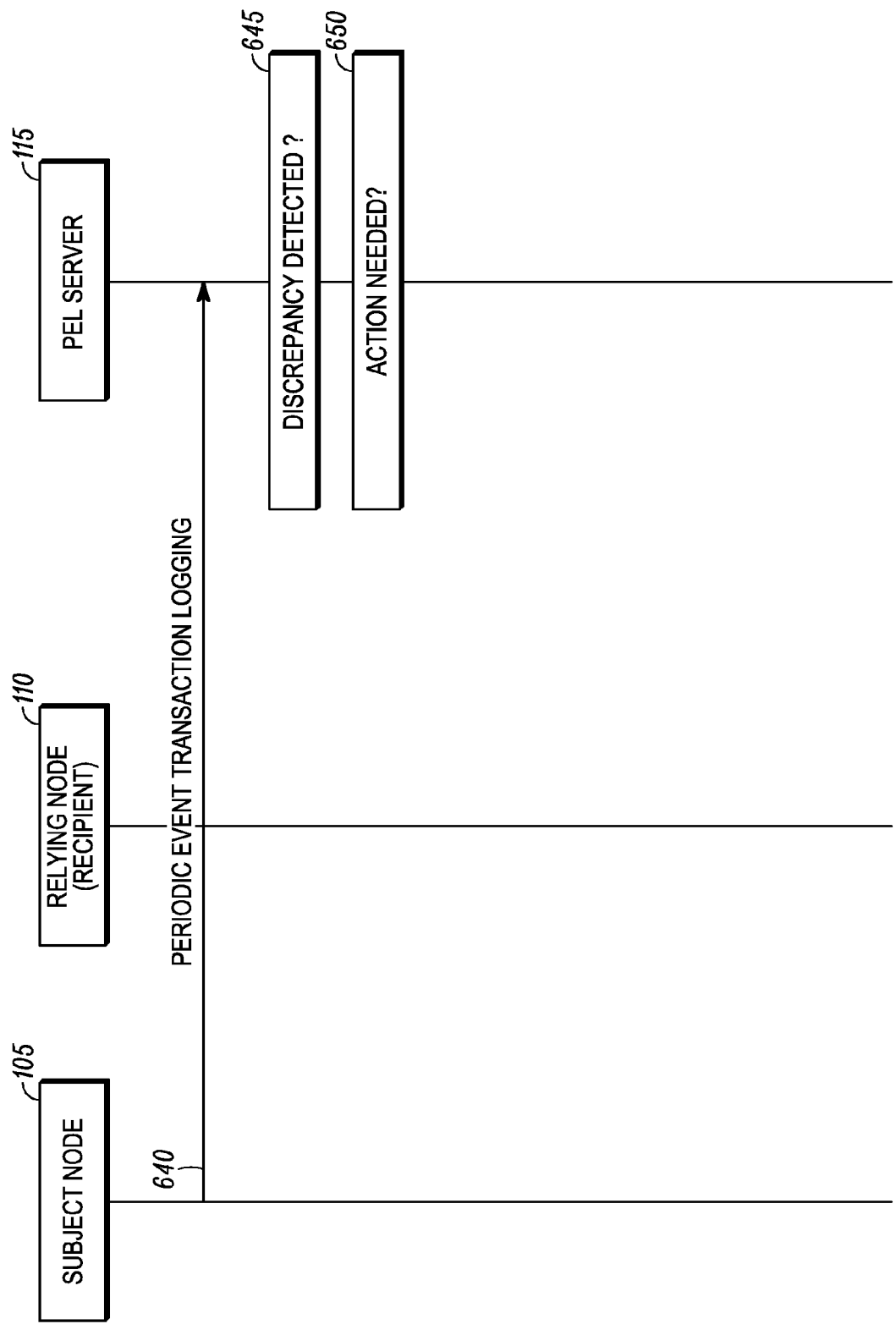

Referring to FIGS. 6A and 6B, message sequence charts illustrate an alternative embodiment of the present invention, where the PEL server 115 actively confirms the authenticity of a PKI transaction event. First, the subject node 105 transmits an authentication message 605 to the relying node 110 in response to an authentication process initiated by the relying node 110. The relying node 110 thus intends to use a certificate of the subject node 105 to authenticate the subject node 105.

As shown at block 625, transaction event data concerning the authentication message 605 are then logged at the subject node 105. At block 610, the relying node 110 then validates the certificate of the subject node 105, logs the transaction event locally, and may also collect additional information concerning the services requested by the subject node 105.

Initiated by the subject node 105, messages 615 are then exchanged between the subject node 105 and the PEL server 115 to establish a mutual security association between the subject node 105 and the PEL server 115. After the mutual security association is established, the subject node 105 transmits to the PEL server 115 a reporting message 620 including a log of the transaction event concerning the subject node 105 and the relying node 110. The log includes PKI transaction event data that describe the authentication event between the relying node 110 and the subject node 105. For example, the reporting message 620 may include a specific time period or transaction number for each reported event. At block 625, the PEL server 115 stores information concerning the transaction event and then waits for the relying node 110 to report the transaction event.

As initiated by the relying node 110, messages 630 are then exchanged between the relying node 110 and the PEL server 115 to establish a mutual security association between the relying node 110 and the PEL server 115. After the mutual security association is established, the relying node 110 transmits to the PEL server 115 a message 635 including PKI transaction event data concerning the authentication between the subject node 105 and the relying node 110. The subject node 105 may then transmit a further message 640 including another log of PKI transaction event data.

Next, the PEL server 115 may automatically compare the PKI transaction event data reported by the subject node 105 with the PKI transaction event data reported by the relying node 110. At block 645, if no discrepancy is detected, then no action is needed. However, if discrepancy is detected, then at block 650 the PEL server 115 may be programmed to take defensive action, such as transmitting a revocation request to a certificate issuing authority so that the certificate of the subject node 105 is immediately revoked.

Messages reported to the PEL server 115 by either the subject node 105 or the relying node 110 may be transmitted periodically, intermittently, or upon request by the PEL server 115. For example, if the subject node 105 temporarily loses a communication link with the PEL server 115, the subject node 105 may locally store transaction event data concerning multiple previous transactions involving the relying node 110. Subsequently, when a viable link between the subject node 105 and the PEL server 115 is resumed, a reporting message can be sent to the PEL server 115 that reports in batch format on the multiple previous transactions involving the relying node 110.

Figure 7:
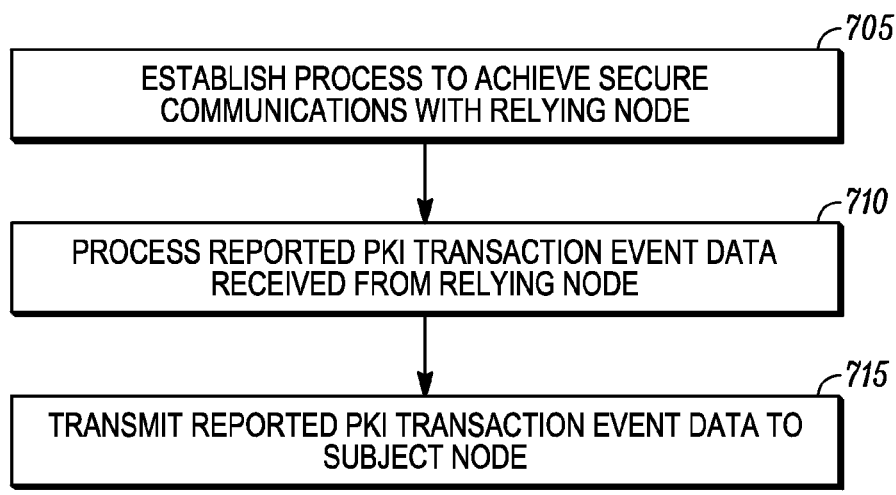
FIG. 7 is a general flow diagram illustrating a method for confirming authenticity of a public key infrastructure (PKI) transaction event between a relying node and a subject node in a communication network, according to some embodiments.

Referring to FIG. 7, a general flow diagram illustrates a method 700 for confirming authenticity of a public key infrastructure (PKI) transaction event between a relying node and a subject node in a communication network, according to some embodiments of the present invention. First, at step 705, a PKI event logging (PEL) server establishes a process to achieve secure communications with the relying node. For example, the PEL server 115 may process the messages 135 described above, such as conventional four way handshake messages.

At step 710, the PEL server processes reported PKI transaction event data received from the relying node, wherein the reported PKI transaction event data describe the PKI transaction event between the relying node and the subject node. For example, the PEL server 115 may process the message 140 including a log of the transaction event concerning the subject node 105 and the relying node 110.

At step 715, the reported PKI transaction event data are transmitted from the PEL server to the subject node. For example, the PEL server 115 may transmit to the subject node 105 the reported PKI transaction event data in the reporting message 155. The subject node can thus compare the reported PKI transaction event data with corresponding local PKI transaction event data to confirm the authenticity of the PKI transaction event.

Figure 8:
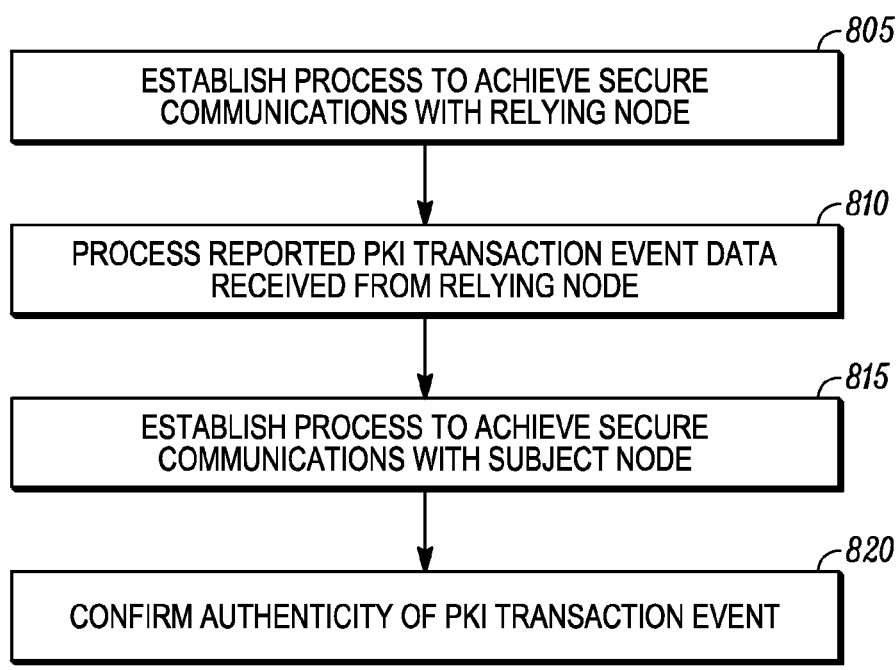
FIG. 8 is a general flow diagram illustrating a method for confirming authenticity of a PKI transaction event between a relying node and a subject node in a communication network, according to an alternative embodiment of the present invention, where authenticity of the PKI transaction event is confirmed at a PEL server.

Referring to FIG. 8, a general flow diagram illustrates a method for confirming authenticity of a public key infrastructure (PKI) transaction event between a relying node and a subject node in a communication network, according to an alternative embodiment of the present invention where authenticity of the PKI transaction event is confirmed at a PKI event logging (PEL) server. At step 805, the PEL server establishes a process to achieve secure communications with the relying node. For example, the messages 630 as described above are used to establish a mutual security association between the relying node 110 and the PEL server 115.

At step 810, the PEL server processes reported PKI transaction event data received from the relying node, wherein the reported PKI transaction event data describe the PKI transaction event between the relying node and the subject node. For example, the relying node 110 transmits to the PEL server 115 the message 635 as described above including PKI transaction event data concerning the authentication between the subject node 105 and the relying node 110.

At step 815, the PEL server establishes a process to achieve secure communications with the subject node. For example, the messages 615 as described above are used to establish a mutual security association between the subject node 105 and the PEL server 115.

At step 820, the PEL server confirms the authenticity of the PKI transaction event by comparing the reported PKI transaction event data and corresponding local PKI transaction event data received from the subject node. For example, as described above concerning FIGS. 6A and 6B, after receiving the message 635 the PEL server 115 may automatically compare the PKI transaction event data reported by the subject node 105 with the PKI transaction event data reported by the relying node 110. If no discrepancy is detected, then no action is needed.

Advantages of some embodiments of the present invention therefore include enabling efficient detection of compromised private keys used in PKI transactions. Embodiments of the invention thus can be used to improve the security of a diverse range of electronic transactions that involve use of digital certificates for identification or for digital signature verification.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of the present teachings. The benefits, advantages, solutions to problems, and any element(s) that may cause any benefit, advantage, or solution to occur or become more pronounced are not to be construed as critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, or contains a list of elements does not include only those elements but may include other elements not expressly listed or inherent to such process, method, article, or apparatus. An element preceded by "comprises a . . . ", "has a . . . ", "includes a . . . ", or "contains a . . . " does not, without more constraints, preclude the existence of additional identical elements in the process, method, article, or apparatus that comprises, has, includes, or contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and system described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for confirming authenticity of a public key infrastructure (PKI) transaction event between a relying node and a subject node in a communication network, the method comprising:
   establishing at a PKI event logging (PEL) server a process to achieve secure communications with the relying node;
   processing at the PEL server reported PKI transaction event data received from the relying node, wherein the reported PKI transaction event data describe the PKI transaction event between the relying node and the subject node; and
   transmitting the reported PKI transaction event data from the PEL server to the subject node, wherein one or more of:
      the reported PKI transaction event data are transmitted from the PEL server to the subject node in response to a query message received at the PEL server from the subject node;
      the reported PKI transaction event data are automatically transmitted from the PEL server to the subject node in response to processing at the PEL server the reported PKI transaction event data; and
   whereby the subject node can compare the reported PKI transaction event data with corresponding local PKI transaction event data to confirm the authenticity of the PKI transaction event.

2. The method of claim 1, wherein confirming the authenticity of the PKI transaction event comprises determining that a private key of the subject node has not been compromised.

3. The method of claim 1, wherein the relying node obtains a uniform resource locator (URL) address of the PEL server from a PKI certificate of the subject node.

4. The method of claim 1, wherein the reported PKI transaction event data include data for a plurality of PKI transaction events.

5. The method of claim 1, wherein processing at the PEL server the reported PKI transaction event data comprises analyzing the reported PKI transaction event data to determine invalid use of PKI certificates associated with the reported PKI transaction event data.

6. The method of claim 1, wherein the PKI transaction event data comprise data selected from the following: a PKI certificate subject, a PKI certificate issuer distinguished name, a subject key identifier (SKI), an issuer key identifier (AKI), a PKI certificate serial number, a transaction identification, a transaction amount, a hash of transaction details, a digital signature of transaction details, a transaction date, a transaction time stamp, a requested transaction type, an originating internet protocol (IP) address of the relying node, and an identification of a triggering application of the relying node.

7. The method of claim 1, wherein the PKI transaction event includes a node authentication event or a message digital signature event.

8. The method of claim 1, wherein the subject node compares the reported PKI transaction event data with the corresponding local PKI transaction event data by comparing one or more of the following parameters included in both the reported PKI transaction event data and the corresponding local PKI transaction event data: a PKI certificate subject, a PKI certificate issuer distinguished name, a subject key identifier (SKI), an issuer key identifier (AKI), a PKI certificate serial number, a transaction identification, a transaction amount, a hash of transaction details, a digital signature of transaction details, a transaction date, a transaction time stamp, a requested transaction type, an originating internet protocol (IP) address of the relying node, and an identification of a triggering application of the relying node.

9. The method of claim 1, wherein the reported PKI transaction event data is received at the PEL server after the relying node has authenticated the subject node.

10. The method of claim 1, wherein the reported PKI transaction event data is received at the PEL server after the relying node has validated a certificate of the subject node.

11. A method for confirming authenticity of a public key infrastructure (PKI) transaction event between a relying node and a subject node in a communication network, the method comprising:
   establishing at a PKI event logging (PEL) server a process to achieve secure communications with the relying node;
   processing at the PEL server reported PKI transaction event data received from the relying node, wherein the reported PKI transaction event data describe the PKI transaction event between the relying node and the subject node;
   establishing at the PKI event logging (PEL) server a process to achieve secure communications with the subject node; and
   confirming that a private key of the subject node has not been compromised by confirming the authenticity of the PKI transaction event at the PEL server, wherein confirming the authenticity of the PKI transaction event comprises comparing the reported PKI transaction event data and corresponding local PKI transaction event data received from the subject node.

12. The method of claim 11, wherein the reported PKI transaction event data is received at the PEL server after the relying node has authenticated the subject node.

13. The method of claim 11, wherein the reported PKI transaction event data is received at the PEL server after the relying node has validated a certificate of the subject node.

14. The method of claim 11, wherein confirming the authenticity of the PKI transaction event comprises determining that a private key of the subject node has not been compromised.

15. The method of claim 11, wherein the relying node obtains a uniform resource locator (URL) address of the PEL server from a PKI certificate of the subject node.

16. The method of claim 11, wherein the reported PKI transaction event data include data for a plurality of PKI transaction events.

17. The method of claim 11, wherein processing at the PEL server the reported PKI transaction event data comprises analyzing the reported PKI transaction event data to determine invalid use of PKI certificates associated with the reported PKI transaction event data.

18. A public key infrastructure (PKI) event logging (PEL) server for confirming authenticity of a PKI transaction event between a relying node and a subject node in a communication network, the PEL server comprising:
   a network interface to communicate with the relying node and the subject node;
   a memory to store reported PKI transaction event data that describe the PKI transaction event between the relying node and the subject node; and
   a processor coupled to the network interface and the memory, the processor configured to:
      establish a process to achieve secure communications with the relying node;
      process the reported PKI transaction event data received from the relying node; and cause the network interface to transmit the reported PKI transaction event data to the subject node, wherein one or more of:

the reported PKI transaction event data are transmitted from the PEL server to the subject node in response to a query message received at the PEL server from the subject node;

the reported PKI transaction event data are automatically transmitted from the PEL server to the subject node in response to processing at the PEL server the reported PKI transaction event data; and whereby the subject node can compare the reported PKI transaction event data with corresponding local PKI transaction event data to confirm the authenticity of the PKI transaction event.

* * * * *

UNITED STATES PATENT AND TRADEMARK OFFICE
CERTIFICATE OF CORRECTION

PATENT NO. : 8,751,791 B2
APPLICATION NO. : 12/212032
DATED : June 10, 2014
INVENTOR(S) : Erwin Himawan et al.

It is certified that error appears in the above-identified patent and that said Letters Patent is hereby corrected as shown below:

IN THE SPECIFICATION:

In Column 7, Line 30, delete "server 515" and insert -- server 115 --, therefor.

Signed and Sealed this
Tenth Day of May, 2016

Michelle K. Lee
*Director of the United States Patent and Trademark Office*